United States Patent
Garm

(10) Patent No.: US 10,132,291 B2
(45) Date of Patent: Nov. 20, 2018

(54) WIND TURBINE BLADE WITH FASTENING MEANS

(71) Applicants: LM WP PATENT HOLDING A/S, Kolding (DK); Jesper Hasselbalch Garm, Kolding (DK)

(72) Inventor: Jesper Hasselbalch Garm, Kolding (DK)

(73) Assignee: LM WP PATENT HOLDING A/S, Kolding (DK)

( * ) Notice: Subject to any disclaimer, the term of this patent is extended or adjusted under 35 U.S.C. 154(b) by 260 days.

(21) Appl. No.: 14/427,317

(22) PCT Filed: Sep. 16, 2013

(86) PCT No.: PCT/EP2013/069112
§ 371 (c)(1),
(2) Date: Mar. 11, 2015

(87) PCT Pub. No.: WO2014/041151
PCT Pub. Date: Mar. 20, 2014

(65) Prior Publication Data
US 2015/0233260 A1 Aug. 20, 2015

(30) Foreign Application Priority Data

Sep. 17, 2012 (EP) .................................. 12184616

(51) Int. Cl.
*F03D 1/06* (2006.01)
*F03D 80/70* (2016.01)

(52) U.S. Cl.
CPC ........... *F03D 1/0658* (2013.01); *F03D 80/70* (2016.05); *F05B 2260/301* (2013.01); *Y02E 10/721* (2013.01)

(58) Field of Classification Search
CPC . F03D 80/70; F03D 1/06; F03D 1/658; F03D 1/0691
See application file for complete search history.

(56) References Cited

U.S. PATENT DOCUMENTS 4,915,590 A * 4/1990 Eckland ................ F03D 1/0658
29/889.21
7,198,471 B2 * 4/2007 Gunneskov ............. F03D 1/065
416/229 R (Continued)

FOREIGN PATENT DOCUMENTS

EP 2138716 A1 12/2009
WO 2006070171 A1 7/2006

OTHER PUBLICATIONS

Gurit, "ST 70 Structural SRINT" retrieved from http://www.gurit.com/-/media/Gurit/Datasheets/st-70v5pdf.ashx on Feb. 14, 2017.*

Primary Examiner — Jason Shanske
Assistant Examiner — Topaz L Elliot
(74) Attorney, Agent, or Firm — Nath, Goldberg & Meyer; Tanya E. Harkins

(57) ABSTRACT

A wind turbine blade having a circular root portion and provided with root bushings for mounting the blade to a wind turbine hub, and the root bushings comprise an elongated cross-sectional profile with a first dimension oriented along a radius of the circular root portion being larger than a second dimension oriented along a circumferential direction of the circular root section.

13 Claims, 4 Drawing Sheets

(56) References Cited

U.S. PATENT DOCUMENTS

| | | | | |
|---|---|---|---|---|
| 7,530,168 B2* | 5/2009 | Sorensen | ................ | B29C 70/86 |
| | | | | 29/889.21 |
| 8,172,538 B2* | 5/2012 | Hancock | ............... | F03D 1/0658 |
| | | | | 264/101 |
| 8,267,630 B2* | 9/2012 | Moon | ....................... | F16B 5/02 |
| | | | | 411/110 |
| 8,388,316 B2* | 3/2013 | Arocena De La Rua | ................... | |
| | | | | B29C 70/865 |
| | | | | 29/527.2 |
| 8,727,731 B2* | 5/2014 | Bendel | .................. | F03D 1/0658 |
| | | | | 416/204 R |
| 9,175,607 B2* | 11/2015 | Welch | .................... | B64D 29/00 |
| 9,370,905 B2* | 6/2016 | Moeller Larsen | ...... | B29C 70/46 |
| 2008/0206059 A1* | 8/2008 | Hancock | ............... | F03D 1/0658 |
| | | | | 416/213 R |
| 2009/0324420 A1* | 12/2009 | Arocena De La Rua | ................... | |
| | | | | B29C 70/865 |
| | | | | 416/248 |
| 2011/0008125 A1* | 1/2011 | Moon | ....................... | F16B 5/02 |
| | | | | 411/108 |
| 2011/0044817 A1* | 2/2011 | Bendel | .................. | F03D 1/0658 |
| | | | | 416/204 R |
| 2011/0164987 A1* | 7/2011 | Grabau | ................... | B29C 33/12 |
| | | | | 416/230 |
| 2012/0045339 A1* | 2/2012 | Fleming | .................... | F01D 5/30 |
| | | | | 416/212 R |
| 2013/0108464 A1* | 5/2013 | McEwen | ................. | F03B 3/121 |
| | | | | 416/244 R |
| 2013/0177428 A1* | 7/2013 | Zeller | ................... | F03D 1/0658 |
| | | | | 416/219 A |
| 2014/0030096 A1* | 1/2014 | Dahl | ....................... | B29C 70/86 |
| | | | | 416/217 |

* cited by examiner

WIND TURBINE BLADE WITH FASTENING MEANS

This is a National Phase Application filed under 35 U.S.C. 371 as a national stage of PCT/EP2013/069112, filed Sep. 16, 2013, an application claiming the benefit to European Application No. 12184616.6, filed Sep. 17, 2012; the content of each of which is hereby incorporated by reference in its entirety.

TECHNICAL FIELD

The present invention relates to a wind turbine blade for a rotor of a wind turbine, preferably having a substantially horizontal rotor shaft, said rotor comprising a hub, from which the blade extends substantially in a radial direction when mounted to the hub, the wind turbine blade including a shell structure of a fibre-reinforced composite material comprising fibres embedded in a polymer matrix, the blade having a longitudinal direction with a tip end and a root end and a transverse direction as well as having a blade length, the blade further comprising: a profiled contour including a pressure side and a suction side, as well as a leading edge and a trailing edge with a chord having a chord length extending there between, the profiled contour, when being impacted by an incident airflow, generating a lift, wherein the profiled contour comprises: a root region comprising a root end face, an airfoil region having a lift-generating profile farthest away from the hub, and optionally a transition region between the root region and the airfoil region, wherein the root region comprises a ring-shaped cross section with an outer surface and an inner surface, wherein the root region comprises a plurality of elongated fastening members provided with fastening means and embedded mutually spaced apart in the fibre-reinforced polymer so as to substantially follow a circumference of the root region and allow access from the outside to the fastening means used for mounting the blade to the hub, the fastening members comprising a first end arranged at the root end face, a second end opposite the first end thereof and an outer periphery.

BACKGROUND

Wind turbine blades and thereby also the root region thereof are often made by assembling two blade halves essentially corresponding to the suction side and the pressure side, respectively, along the chord plane. However, the blades may also be moulded in their entirety by so-called hollow moulding.

The root region comprises layers of fibres forming an outer layer and an inner layer between which fastening members in the form of bushings are placed. Separately formed inserts may be placed between each pair of adjacent bushings, whereby the bushings are mutually separated by the inserts. The known inserts are made of glass fibres embedded in a suitable resin.

A potential problem in connection with wind turbine blades is load transfer from the fibre composite structure of the root region to the hub of the wind turbine. The connection and transfer of loads from the blade to the hub is inter alia provided by mounting the blade to the hub by mounting bolts into the bushings placed in the root or by means of nuts mounted onto the stud bolts mounted into the bushings. In case the number of bolts and thereby the number of bushings has to be increased to handle a given load, the remaining area of the fibre composite material between the bushings is reduced. This may result in the root connection being insufficiently supported to withstand the loads, whereby the connection between the blade root and the hub may fail since the bushings are insufficiently retained in the composite material and thus pulled out of the composite material of the root region. This is especially a problem when long and thereby heavy blades are to be used. In principle, it is also possible to increase the area of the bushings so that the bushings are located along the entire circumference of the root. However, such a solution adds weight to the root region and further increases costs. Further, it is a restraint that the bushings of course only can extend along the entire circumference of the blade.

WO 2006/070171 discloses a method of manufacturing a wind turbine shell member provided with an incorporated fastening member near the root. The document mentions that it may be advantageous for thin blade shells in using fastening members with an oval cross section and the major axis oriented parallel to the surface of the blade shell. If the oval fastening members have to be closely spaced, the fastening members may be slightly skewed but still substantially parallel to the surface of the blade shell.

DE 10 2008 021498 A1 discloses a method for manufacturing a blade connection of a rotor blade for a wind turbine system, wherein fastening members are arranged equidistantly spaced on an arc. The fastening members may have a trapezoidal or square cross-section.

EP 2 138 716 A1 discloses a blade insert connected in the lamination of a wind turbine blade. The inserts may be separated by separators made from fiberglass or foam.

WO 2010/018225 provides a method of manufacturing a wind turbine blade comprising a steel wire or steel fibre-reinforced polymer matrix. However, the document does not address the problem of how the root region is to be designed to withstand extreme loads in the connection between the blade root and the hub.

DISCLOSURE OF THE INVENTION

Therefore, it is an object of the invention to obtain a new wind turbine blade, which overcomes or ameliorates at least one of the disadvantages of the prior art or which provides a useful alternative.

Thus, according to a first aspect, the invention provides a solution in which the fastening members comprises an elongated cross-sectional profile with a first dimension oriented in a radial direction of the ring-shaped cross-section being larger than a second dimension oriented in a circumferential direction of the ring shaped cross-section. In other words, the fastening members comprise an elongated cross-sectional profile having a long axis oriented along the radius of the root region and a short axis oriented along the circumferential or tangential direction of the root region.

Thereby, it is achieved that the bending stiffness of the fastening members is maximised in the radial direction, while the cross-sectional area of the fastening members is minimised. Thus, the fastening members are designed and arranged so as to take up the necessary loads, while the weight and cost of the root region may be minimised. In particular for fastening members in form of bushings, the advantage is that the local bending of the bushing decreases. This is an advantage for the bolted connection to the pitch bearing or the hub, as bending of the bolts in the radial direction is often a limiting factor for the bolt design. Accordingly, the overall radius ring-shaped root region may still be minimised, thus providing a workable solution for mounting the blade to the hub of a wind turbine.

According to an advantageous embodiment, the first dimension is at least 10%, or 15%, or 20%, or 25% larger than the second dimension.

According to a first advantageous embodiment, at least a number of the fastening members have an elongated cross-sectional profile being substantially rectangular. According to a second advantageous embodiment, at least a number of the fastening members have an elongated cross-sectional profile being substantially elliptical. According to a third advantageous embodiment, at least a number of the fastening members have an elongated cross-sectional profile being substantially trapezoidal. The sides of the trapezoidal fastening members may be arranged along the radius of the circular root section. In principle, it may also be possible to use fastening members having different shapes, e.g. combinations of the afore-mentioned profiles.

The fastening members may also advantageously be corrugated in the longitudinal direction. This may increase the bonding to surrounding fibre-reinforced matrix material.

According to a first embodiment, the fastening members are tapered in the longitudinal direction so that the cross-sectional area at the second end is smaller than the first end of the fastening members. This provides for a solution with a smooth transition in stiffness in the longitudinal direction of the blade.

According to an alternative embodiment, the fastening members are tapered in the longitudinal direction so that the cross-sectional area at the second end is larger than the first end of the fastening members. This increases the pull-out strength of the fastening means.

It may also be possible to provide fastening members having a double-tapered profile so as to both increase pull-out strength and provide a smooth transition in stiffness in the longitudinal direction of the blade.

Advantageously, the fastening members are made by casting, e.g. made of cast steel.

According to a preferred embodiment, the fastening members are bushings. The bushings advantageously comprise an inner threaded bore, e.g. to take up a stay bolt. Thus, it is clear that the fastening means in this embodiment is a threaded bore.

The second dimension may for instance be at least 20% larger than a diameter of the threaded bore.

In an advantageous embodiment, the root region further comprises a number of inserts arranged in regions between adjacent fastening members, the insert abutting at least a part of the outer periphery of the fastening members. Thus, the inserts function as retaining means and ensure that the fastening members are located at the right positions, such as equidistantly along the circumference of the circular root region. The insert may for instance be formed of a fibre-reinforced polymer. The insert may for instance be formed as butterfly wedges, where the sides correspond to the outer surface of the abutting fastening members.

The fastening members may comprise a taper section at the second end of the fastening members so as to provide the smooth transition to the fibre-reinforced laminate. The inserts may also comprise a taper section at the end facing away from the root end face. The taper section ensures that a smooth transition in stiffness is obtained in the longitudinal direction of the blade shell.

The taper sections may be formed as separate wedges arranged in longitudinal extension of the fastening members and inserts, respectively. Alternatively, they can be integrally formed with the fastening members and inserts.

The shell structure may be assembled from two or more shell parts. Typically, the shell parts are manufactured as the pressure side and the suction side of the blade, respectively. The two parts are then glued or otherwise adhered to each other, often at the leading edge and trailing edge of the blade.

According to a second aspect, the invention provides a wind turbine comprising a number of blades, e.g. two or three, according to the first invention, said blades being connected to a hub of the wind turbine.

BRIEF DESCRIPTION OF THE DRAWINGS

The invention is explained in detail below with reference to an embodiment shown in the drawings, in which.

DETAILED DESCRIPTION OF THE INVENTION

Figure 1:
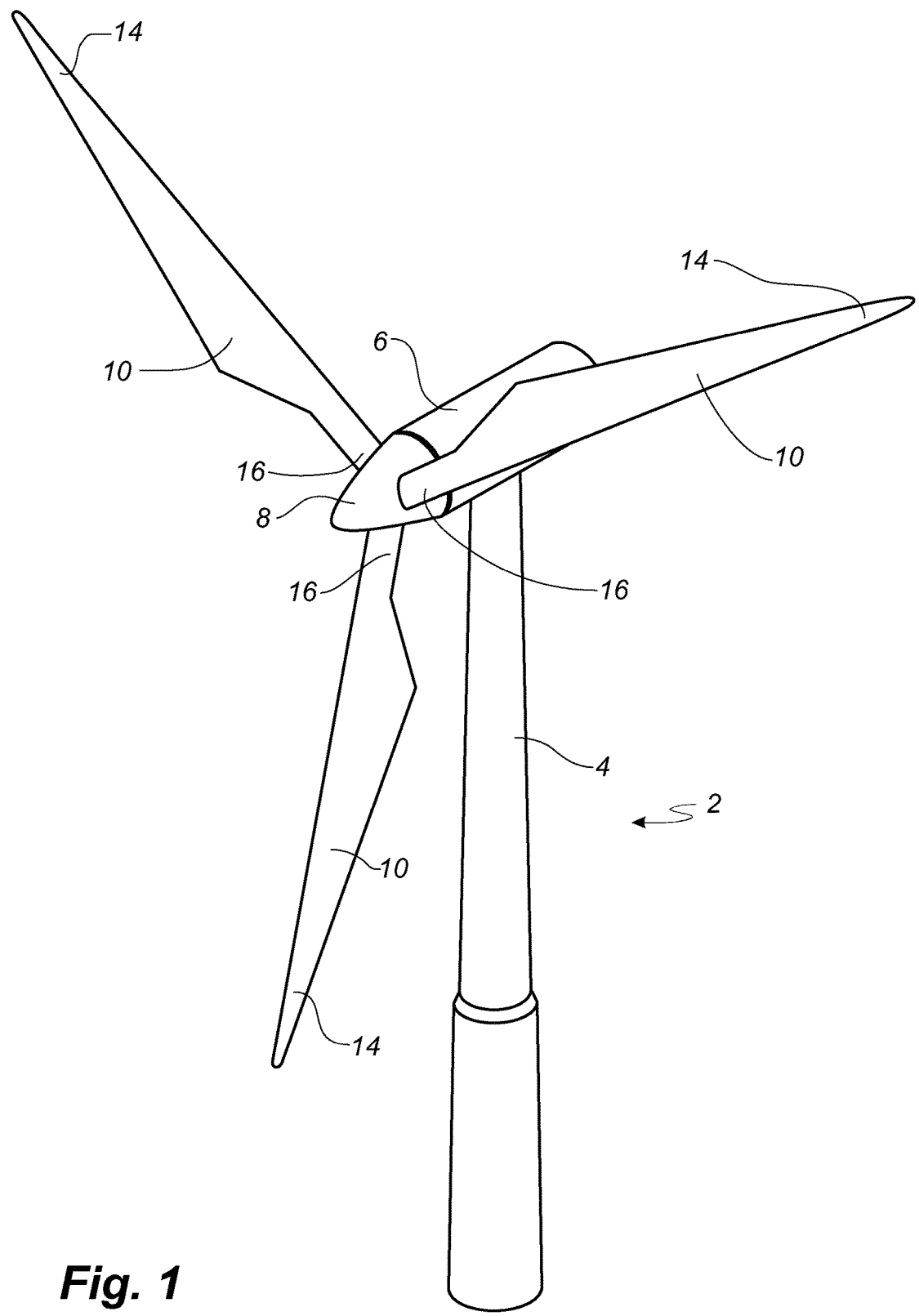
FIG. 1 shows a wind turbine.

FIG. 1 illustrates a conventional modern upwind wind turbine according to the so-called "Danish concept" with a tower 4, a nacelle 6 and a rotor with a substantially horizontal rotor shaft. The rotor includes a hub 8 and three blades 10 extending radially from the hub 8, each having a blade root 16 nearest the hub and a blade tip 14 farthest from the hub 8. The rotor has a radius denoted R.

Figure 2:
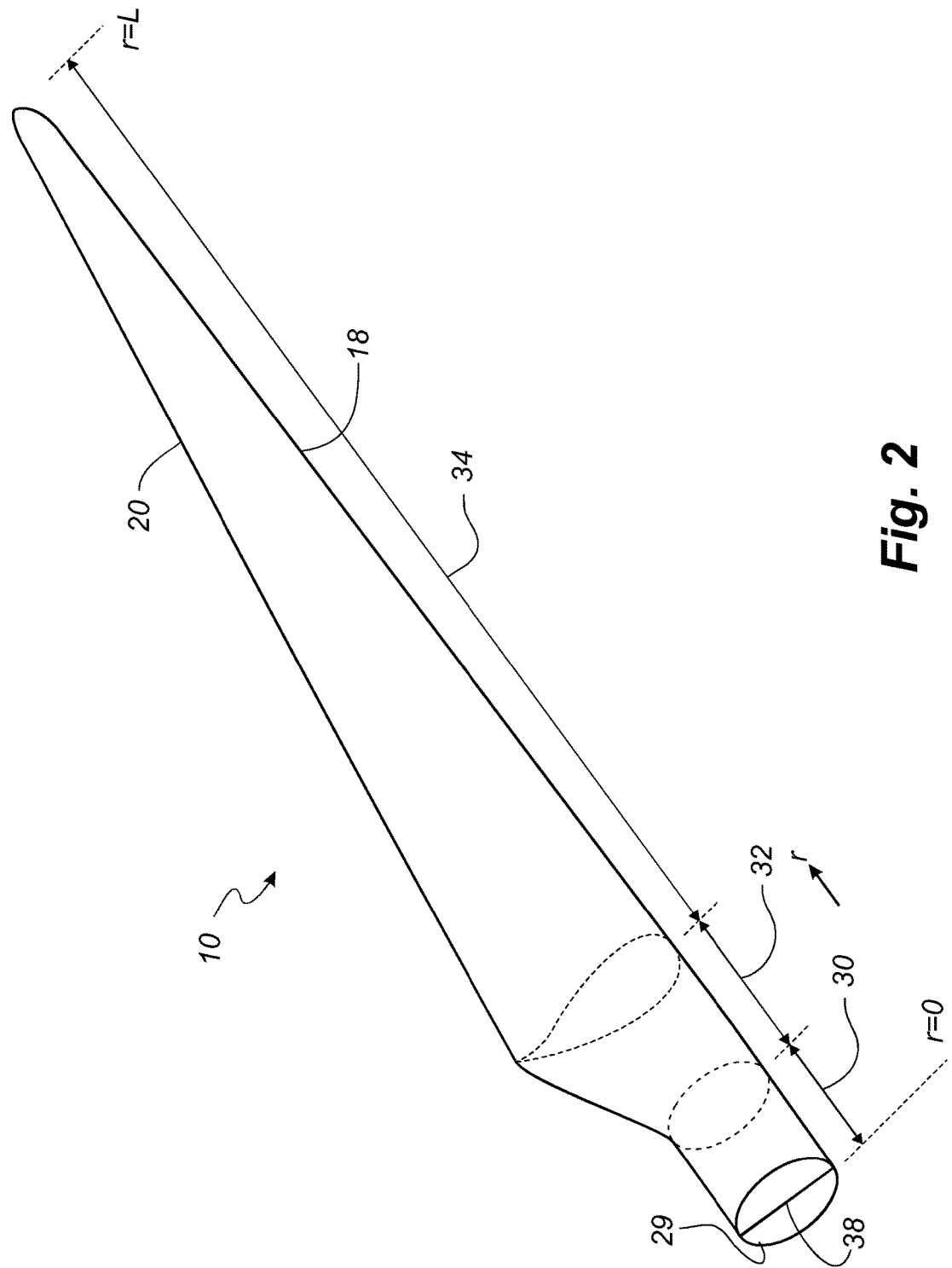
FIG. 2 is a diagrammatic perspective view of a wind turbine blade according to the invention.

FIG. 2 shows a schematic view of a of a wind turbine blade 10. The wind turbine blade 10 has the shape of a conventional wind turbine blade and comprises a root region 30 with a root end face 29 closest to the hub, a profiled or an airfoil region 34 farthest away from the hub and a transition region 32 between the root region 30 and the airfoil region 34. The blade 10 comprises a leading edge 18 facing the direction of rotation of the blade 10, when the blade is mounted on the hub, and a trailing edge 20 facing the opposite direction of the leading edge 18.

The airfoil region 34 (also called the profiled region) has an ideal or almost ideal blade shape with respect to generating lift, whereas the root region 30 due to structural considerations has a substantially circular or elliptical cross-section, which for instance makes it easier and safer to mount the blade 10 to the hub. The diameter (or the chord) of the root region 30 may be constant along the entire root area 30, but often the transition towards the airfoil region starts close to the root end face 29. The transition region 32 has a transitional profile gradually changing from the circular or elliptical shape of the root region 30 to the airfoil profile of the airfoil region 34. The chord length of the transition region 32 typically increases with increasing distance r from the hub. The airfoil region 34 has an airfoil profile with a chord extending between the leading edge 18 and the trailing edge 20 of the blade 10. The width of the chord decreases with increasing distance r from the hub.

The blade is often made of two blade halves assembled by being glued or bolted together substantially along a chord plane 38 of the blade. It should be noted that the chord plane does not necessarily run straight over its entire extent, since the blade may be twisted and/or curved, thus providing a chord plane with a correspondingly twisted and/or curved course, this being most often the case in order to compensate for the local velocity of the blade being dependent on the radius from the hub. Due to the circular cross section, the root region 30 does not contribute to the production of the wind turbine and, in fact, it lowers the production slightly due to the drag.

Figure 3:
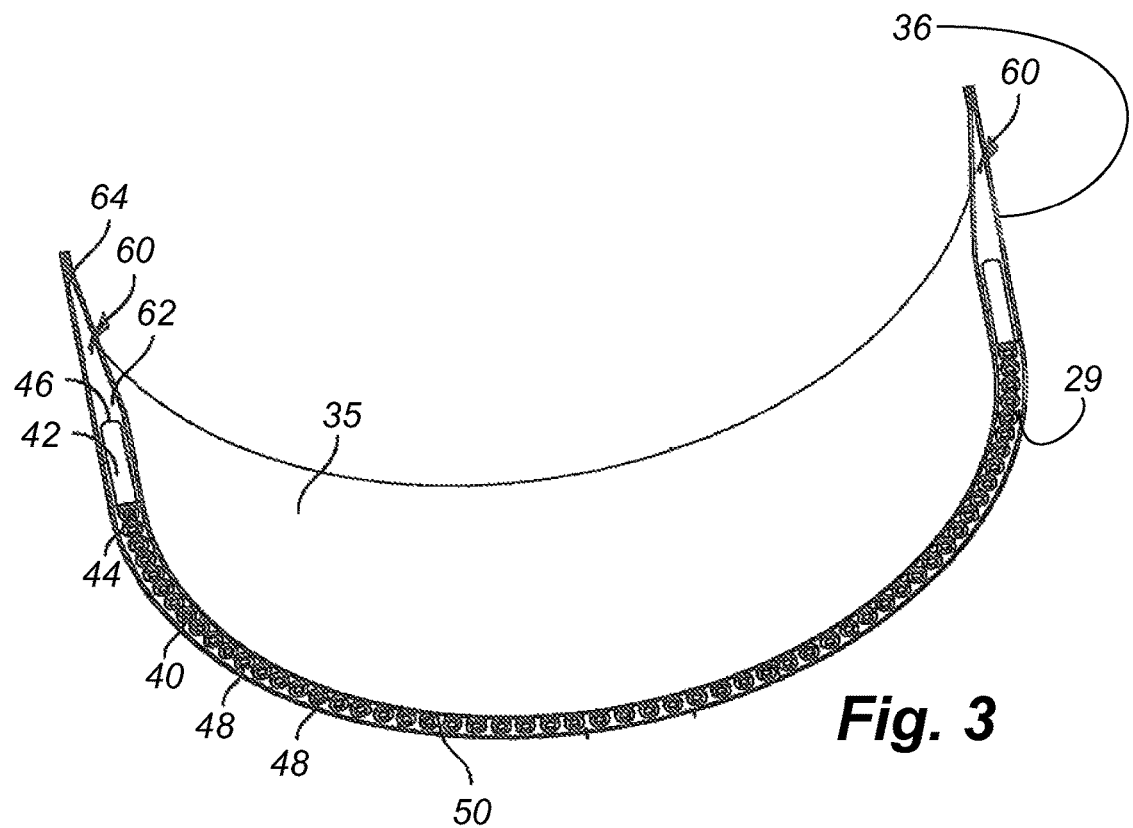
FIG. 3 is a perspective, longitudinal, sectional view of a portion of a root region of a first embodiment of a wind turbine blade according to the invention.
Figure 4:
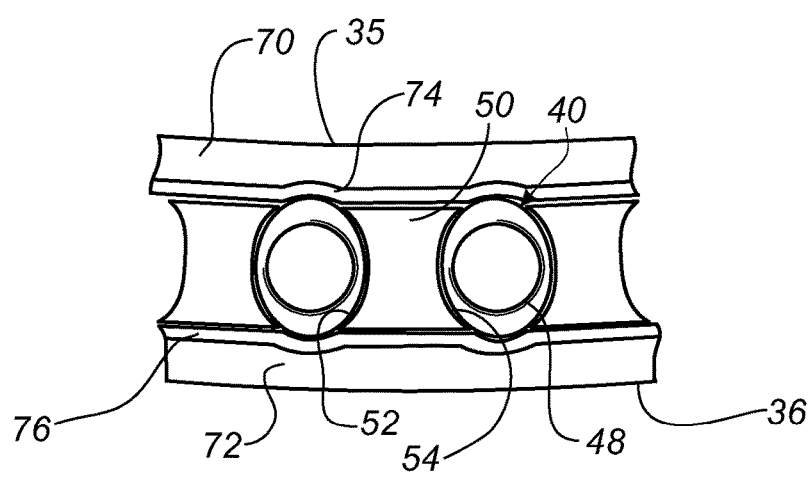
FIG. 4 is a longitudinal sectional view of a portion of the embodiment shown in FIG. 3, and FIGS. 5a-e show different embodiments of bushings according to the invention.

As seen in FIGS. 3 and 4, the blade including the root region 30 is formed as a shell structure. The shell structure of the root region 30 is ring-shaped and comprises an outer surface 36 formed by an outer layer 72 of a fibre-reinforced polymer matrix advantageously of glass fibres and/or carbon fibres and a resin, such as epoxy, polyester or vinylester, and an oppositely arranged inner surface 35 formed by an inner layer 70 being made of the same material as the outer layer 72. Elongated fastening members 40 with fastening means 48 are placed between the layers 70, 72, optionally with an inner retaining layer 74 and outer retaining layer 76 in between. Advantageously, the elongated fastening members 40 are bushings having an elongated cross section with a long axis arranged along the radius of the circular root section and the short axis arranged along the circumferential direction of the root section, and comprise a threaded bore 48 as fastening means. The bushing 40 comprises a first end 44 and an oppositely arranged second end 46. The first end 44 of the bushing 40 is placed at the root end face 29 of the root region. As shown in FIG. 3, a cross-sectional area of the bushing 40 is substantially uniform from the first end 44 to the second end 46. The bushings 40 are arranged mutually spaced apart so as to substantially follow the circumference of the root region and allow access from the outside to the fastening means 48, i.e. the threads used for mounting the blade to the hub, e.g. via stay bolts. Seen relative to the root region, the outer periphery 42 of the fastening members 40 comprises an outer surface, an opposite inner surface, a first lateral face, and an opposite lateral face, as shown in FIG. 4.

Intermediate retaining means 50, e.g. made of a fibre-reinforced polymer, are arranged in each region between adjacent interspaced lateral surfaces of the fastening members 40, i.e. in the present example between the bushings. Further, in the present embodiment the intermediate retaining means are formed of separately manufactured inserts 50. The inserts 50 may comprise a first insert part and a second insert part. The first insert part essentially corresponds to the region between the lateral faces of adjacent bushings 40 and is provided with opposite lateral faces 52, 54 formed complimentary to the lateral faces of the adjacent bushings 40, as shown in FIG. 4. The inserts 50 substantially extend up next to the adjacent bushings when seen in circumferential direction. Further, the first insert part extends from the first end of the bushings 40 and beyond the second end thereof. The second insert part is a wedge-shaped tapering extension of the first insert part. The first insert part may have an extent substantially corresponding to that of the bushings 40.

Figure 5A:
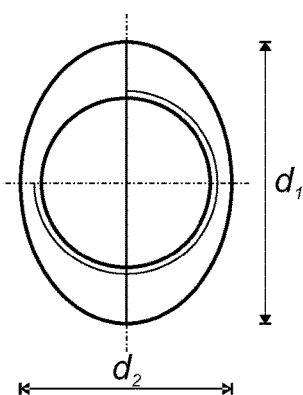
Figure 5B:
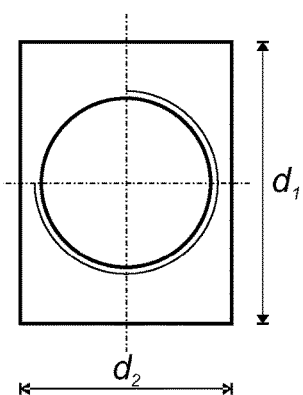
Figure 5C:
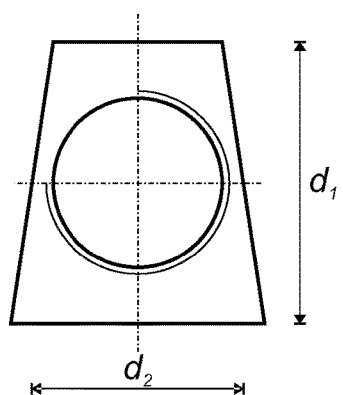
Figure 5D:
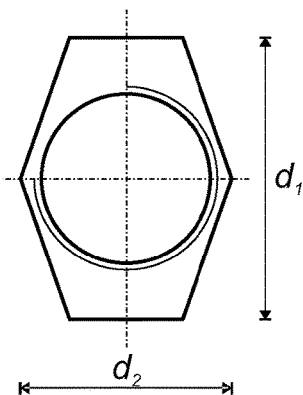
Figure 5E:
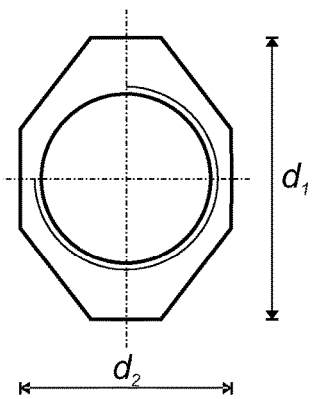

The bushings 40 may have various cross sectional profiles. As shown in FIGS. 4 and 5a, the cross-sectional profile may be substantially elliptical so that a long axis having a length $d_1$ is oriented along the radius of the circular root region. In a second embodiment, the cross-sectional profile of the bushing is rectangular as shown in FIG. 5b. As shown in FIG. 5c, the cross-sectional profile may also be substantially trapezoidal, e.g. with the sides of the bushing being oriented along the radius of the circular root portion. Alternatively, the trapezoidal bushings and the juxtaposed inserts may be adapted to retain each other in the circular root portion. The bushings may also have a cross-sectional profile with a polygonal shape, e.g. being hexagonal as shown in FIG. 5d or octagonal as shown in FIG. 5e. It is clear that the inserts arranged between the bushings must have shapes that are complimentary to the outer periphery of the bushings.

It is a common feature of the various embodiments shown in FIG. 5a-e that the bushings comprise a long axis oriented along a radius of the circular root section and having a first length $d_1$ and a short axis oriented along the circumference or tangent of the circular root section and having a second length $d_2$. The first length $d_1$ is advantageously at least 10%, more advantageously at least 20% larger than the second length $d_2$. The various embodiments also comprise a threaded bore having a diameter D. The second length $d_2$ is advantageously measured through the centre of the threaded bore. The second length is advantageously at least 20% larger than the diameter D.

The invention has been described with reference to a preferred embodiment. However, the scope of the invention is not limited to the illustrated embodiment, and alterations and modifications may be carried out without deviating from the scope of the invention, which is defined by the following claims.

LIST OF REFERENCE NUMERALS 2 wind turbine
4 tower
6 nacelle
8 hub
10 blade
14 blade tip
16 blade root
18 leading edge
20 trailing edge
22 pitch axis
29 root end face
30 root region
32 transition region
34 airfoil region
35 inner surface of root region
36 outer surface of root region
38 chord plane
40 fastening member, bushing
42 outer periphery of fastening member
44 first end of fastening member
46 second end of fastening member
48 fastening means, threaded bore
50 insert
52 first lateral face of insert
54 second lateral face of insert
60 wedge-shaped element
62 first end of wedge-shaped element
64 second end of wedge-shaped element
70 inner layer
72 outer layer
r local radius, radial distance from blade root
L blade length

The invention claimed is:

1. A wind turbine blade (10) for a rotor of a wind turbine (2), said rotor comprising a hub (8), from which the blade (10) extends substantially in a radial direction when mounted to the hub (8), the wind turbine blade including a shell structure of a fibre-reinforced composite material comprising fibres embedded in a polymer matrix, the blade having a longitudinal direction (r) with a tip end (16) and a root end (14) and a transverse direction as well as having a blade length (L), the blade further comprising:

a profiled contour including a pressure side and a suction side, as well as a leading edge (18) and a trailing edge (20) with a chord having a chord length (c) extending there between, the profiled contour, when being impacted by an incident airflow, generating a lift, wherein the profiled contour comprises:
a root region (30) comprising a root end face (29), and
an airfoil region (34) having a lift-generating profile furthest away from the hub, wherein
the root region comprises a ring-shaped cross section with an outer surface (36) and an inner surface (35), wherein the root region (30) comprises a plurality of elongated fastening members (40) provided with fastening means (48) and embedded mutually spaced apart in the fibre-reinforced composite material so as to substantially follow a circumference of the root region (30) and allow access from the outside to the fastening means (40) used for mounting the blade (10) to the hub (8),
the elongated fastening members (40) comprise a first end (44) arranged at the root end face, a second end (46) opposite the first end (44) thereof and an outer periphery (42), wherein
the elongated fastening members (40) comprise an elongated cross-sectional profile with a first dimension ($d_1$) oriented in a radial direction of the ring-shaped cross-section being larger than a second dimension ($d_2$) oriented in a circumferential direction of the ring shaped cross-section, the elongated cross-sectional profile is substantially elliptical over the entire longitudinal extent of the elongated fastening members, and a cross-sectional area of each elongated fastening member is substantially uniform from the first end to the second end.

2. The wind turbine blade (10) according to claim 1, wherein the first dimension is at least 10% larger than the second dimension.

3. The wind turbine blade (10) according to claim 2, wherein the first dimension is at least 15% larger than the second dimension.

4. The wind turbine blade (10) according to claim 3, wherein the first dimension is at least 20% larger than the second dimension.

5. The wind turbine blade (10) according to claim 4, wherein the first dimension is at least 25% larger than the second dimension.

6. The wind turbine blade (10) according to claim 1, wherein the elongated fastening members (40) are made by casting.

7. The wind turbine blade (10) according to claim 6, wherein the elongated fastening members (40) are made of cast steel.

8. The wind turbine blade (10) according to claim 1, wherein the elongated fastening members (40) are bushings.

9. The wind turbine blade (10) according to claim 8, wherein the fastening means comprise an inner threaded bore.

10. The wind turbine blade (10) according to claim 9, wherein the second dimension is at least 20% larger than a diameter of the threaded bore.

11. The wind turbine blade (10) according to claim 1, wherein the root region further comprises a number of inserts arranged in regions between adjacent elongated fastening members, the insert abutting at least a part of the outer periphery of the elongated fastening members.

12. The wind turbine blade (10) according to claim 11, wherein the inserts are formed of a fibre-reinforced polymer.

13. The wind turbine blade (10) according to claim 1, wherein the profiled contour further comprises a transition region (32) between the root region (30) and the airfoil region (34).

* * * * *